(12) United States Patent
Yano

(10) Patent No.: US 11,428,178 B2
(45) Date of Patent: Aug. 30, 2022

(54) FUEL VAPOR TREATING APPARATUS

(71) Applicant: TOYOTA JIDOSHA KABUSHIKI KAISHA, Toyota (JP)

(72) Inventor: Masaaki Yano, Miyoshi (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 17/462,457

(22) Filed: Aug. 31, 2021

(65) Prior Publication Data

US 2022/0090549 A1 Mar. 24, 2022

(30) Foreign Application Priority Data

Sep. 24, 2020 (JP) .............................. JP2020-159577

(51) Int. Cl.
  *F02D 41/00* (2006.01)
  *F16K 31/06* (2006.01)
  *F02M 25/08* (2006.01)

(52) U.S. Cl.
  CPC ..... *F02D 41/0032* (2013.01); *F02M 25/0836* (2013.01); *F16K 31/0675* (2013.01)

(58) Field of Classification Search
  CPC ............ F02D 41/0032; F02M 25/0836; F16K 31/0675
  See application file for complete search history.

(56) References Cited

U.S. PATENT DOCUMENTS

| | | | | |
|---|---|---|---|---|
| 3,762,385 A | * | 10/1973 | Hollnagel | F02M 31/10 123/574 |
| 4,601,264 A | * | 7/1986 | Hirano | F01P 11/18 123/41.27 |
| 4,768,493 A | * | 9/1988 | Ohtaka | F01M 13/00 123/573 |
| 5,559,706 A | * | 9/1996 | Fujita | F02D 41/1495 123/690 |
| 5,970,962 A | * | 10/1999 | Nelson | F01M 13/00 123/573 |
| 6,062,206 A | * | 5/2000 | Nelson | F01M 13/00 123/573 |

(Continued)

FOREIGN PATENT DOCUMENTS

| | | |
|---|---|---|
| JP | H 10-281021 A | 10/1998 |
| JP | 2008-190397 A | 8/2008 |
| JP | 2009-221905 A | 10/2009 |

*Primary Examiner* — Phutthiwat Wongwian
*Assistant Examiner* — Sherman D Manley
(74) *Attorney, Agent, or Firm* — Finnegan, Henderson, Farabow, Garrett & Dunner, LLP

(57) ABSTRACT

A fuel vapor treating apparatus includes a canister, a purge pipe, a purge control valve, and a heating device. The canister is configured to store fuel vapor generated in a fuel tank. The purge pipe is configured to deliver the fuel vapor stored in the canister to an intake passage of an internal combustion engine together with air. The purge control valve is configured to be attached to the purge pipe to be selectively opened and closed in order to adjust a purge flow rate. The purge control valve is also configured to be opened based on a purge request that is made after the internal combustion engine is started. The heating device is configured to heat the purge control valve after the internal combustion engine is started and before the purge request is made.

3 Claims, 3 Drawing Sheets

(56) References Cited

U.S. PATENT DOCUMENTS

| | | | | |
|---|---|---|---|---|
| 6,412,479 B1* | 7/2002 | Canfield | F28D 15/02 | 123/573 |
| 6,478,043 B2* | 11/2002 | Ishigaki | F16K 41/10 | 137/341 |
| 6,546,921 B1* | 4/2003 | Callahan | F02M 25/06 | 123/573 |
| 7,263,984 B2* | 9/2007 | Wade | F16L 53/38 | 123/572 |
| 8,210,135 B2* | 7/2012 | Slaughter | F01M 13/04 | 123/41.86 |
| 8,602,009 B2* | 12/2013 | Park | F01P 3/20 | 123/573 |
| 9,416,699 B2* | 8/2016 | Hasegawa | F01M 13/04 | |
| 9,702,282 B2* | 7/2017 | Peck | F01M 13/04 | |
| 2002/0046609 A1* | 4/2002 | Ito | F02M 25/0809 | 73/700 |
| 2004/0144373 A1* | 7/2004 | Spix | F02M 35/104 | 123/572 |
| 2006/0011174 A1* | 1/2006 | Perry | F16K 24/04 | 123/520 |
| 2006/0236989 A1* | 10/2006 | Callahan | F02M 25/06 | 123/574 |
| 2008/0099000 A1* | 5/2008 | Suzuki | F01M 13/0011 | 123/574 |
| 2009/0031996 A1* | 2/2009 | Chung | F02M 31/20 | 123/518 |
| 2009/0229584 A1* | 9/2009 | Asanuma | F01M 13/0011 | 219/205 |
| 2011/0308302 A1* | 12/2011 | Makino | F02M 25/0836 | 73/40.7 |
| 2015/0292421 A1* | 10/2015 | Pursifull | F02M 25/089 | 123/518 |
| 2015/0354420 A1* | 12/2015 | Kira | F01M 13/04 | 123/574 |
| 2017/0204796 A1* | 7/2017 | Dudar | F02M 25/089 | |
| 2018/0058384 A1* | 3/2018 | Dudar | F02D 41/221 | |

* cited by examiner

FUEL VAPOR TREATING APPARATUS

1. FIELD

The present disclosure relates to a fuel vapor treating apparatus.

2. DESCRIPTION OF RELATED ART

A vehicle equipped with an internal combustion engine includes a fuel vapor treating apparatus, which treats fuel vapor generated in a fuel tank storing fuel for the internal combustion engine. As disclosed in Japanese Laid-Open Patent Publication No. 10-281021, a fuel vapor treating apparatus includes a canister, a purge pipe, and a purge control valve. The canister stores fuel vapor generated in a fuel tank. The purge pipe delivers the fuel vapor stored in the canister to the intake passage of the internal combustion engine together with air. The purge control valve is attached to the purge pipe to adjust a purge flow rate. When a purge request is made after the internal combustion engine is started, the fuel vapor treating apparatus opens the purge control valve. As a result, the fuel vapor stored in the canister, together with air, is delivered as purge gas to the intake passage of the internal combustion engine, and is treated.

In some cases, the purge pipe of a fuel vapor treating apparatus is made of a rubber hose or a nylon hose to ensure flexibility. During manufacture of rubber hoses or nylon hoses, a mold release agent (such as stearic acid) is used. Thus, if a purge pipe is made of a rubber hose or a nylon hose, the purge pipe contains a mold release agent. When purge gas flows through a purge pipe containing a mold release agent, the purge gas carries the mold release agent to the purge control valve. As a result, the mold release agent collects on the purge control valve.

The viscosity of stearic acid used in the mold release agent increases at low temperatures. Thus, in a low-temperature condition such as after the internal combustion engine is started, the collected mold release agent (stearic acid) may cause the purge control valve to become stuck. Accordingly, the purge control valve may fail to open because it is stuck when a purge request is made after the internal combustion engine is started.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a fuel vapor treating apparatus is provided that includes a canister, a purge pipe, a purge control valve, and a heating device. The canister is configured to store fuel vapor generated in a fuel tank. The purge pipe is configured to deliver the fuel vapor stored in the canister to an intake passage of an internal combustion engine together with air. The purge control valve is configured to be attached to the purge pipe to be selectively opened and closed in order to adjust a purge flow rate. The purge control valve is configured to be opened based on a purge request that is made after the internal combustion engine is started. The heating device is configured to heat the purge control valve after the internal combustion engine is started and before the purge request is made.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A fuel vapor treating apparatus 2 according to a first embodiment will now be described with reference to FIGS. 1 to 3.

Figure 1:
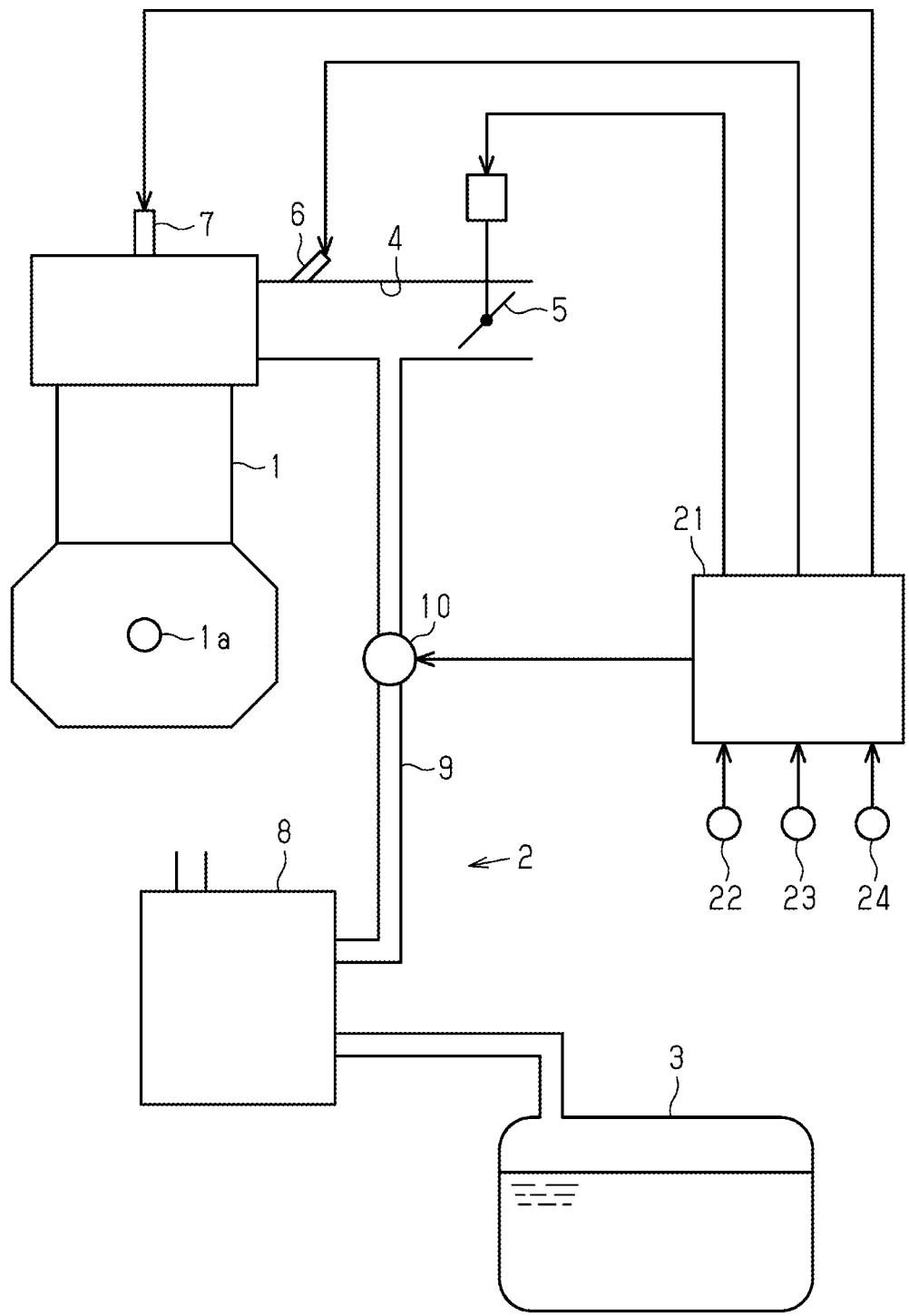
FIG. 1 is a schematic diagram showing an internal combustion engine and a fuel vapor treating apparatus mounted on a vehicle in a first embodiment.

As shown in FIG. 1, a vehicle equipped with an internal combustion engine 1 includes the fuel vapor treating apparatus 2. The fuel vapor treating apparatus 2 is configured to treat fuel vapor generated in a fuel tank 3, which stores fuel for the internal combustion engine 1.

The internal combustion engine 1 draws the air in an intake passage 4, that is, intake air, into a combustion chamber. The intake passage 4 incorporates a throttle valve 5, which adjusts the cross-sectional flow area of the intake passage 4. The internal combustion engine 1 mixes fuel injected from a fuel injection valve 6 into the intake air. The mixture of the intake air and the fuel is ignited by an ignition plug 7 of the internal combustion engine 1. The air-fuel mixture is thus burned in the combustion chamber of the internal combustion engine 1. Burning of the air-fuel mixture produces combustion energy, which in turn rotates an output shaft 1a of the internal combustion engine 1.

The fuel vapor treating apparatus 2 includes a canister 8, a purge pipe 9, and a purge control valve 10. Fuel vapor generated in the fuel tank 3 flows into the canister 8 and is then adsorbed by an adsorbent disposed in the canister 8. The canister 8 thus stores fuel vapor. The purge pipe 9 connects the canister 8 to a section of the intake passage 4 downstream of the throttle valve 5 in the internal combustion engine 1. The purge pipe 9 is made of a rubber hose or a nylon hose to ensure flexibility. This adds to the flexibility in the arrangement of the purge pipe 9.

The purge pipe 9 is configured to deliver the fuel vapor stored in the canister 8 to the intake passage 4 of the internal combustion engine 1. The purge control valve 10 is attached to the purge pipe 9. The purge pipe 9 includes an upstream section, which is located upstream of the purge control valve 10, and a downstream section, which is located downstream of the purge control valve 10. When the purge control valve 10 is opened, the upstream section and the downstream section of the purge pipe 9 are connected to each other. When the purge control valve 10 is closed, the upstream section and the downstream section of the purge pipe 9 are disconnected from each other. Thus, the flow rate (purge flow rate) of fluid (purge gas) that flows from the purge pipe 9 to the intake passage 4 is adjusted by changing the opening degree of the purge control valve 10.

A negative pressure is created in a section of the intake passage 4 that is downstream of the throttle valve 5. When the purge control valve 10 is opened, the atmospheric air is drawn into the canister 8 due to the negative pressure. When passing through the adsorbent in the canister 8, the atmospheric air carries vapor away from the adsorbent. The atmospheric air with the vapor flows to the purge pipe 9 as purge gas, and then flows to a section of the intake passage 4 downstream of the throttle valve 5 in the internal combustion engine 1. The purge gas (vapor) that has flowed into the intake passage 4 is treated by being burned in the combustion chamber of the internal combustion engine 1 together with air-fuel mixture.

The purge control valve 10 and the surrounding structure will now be described.

Figure 2:
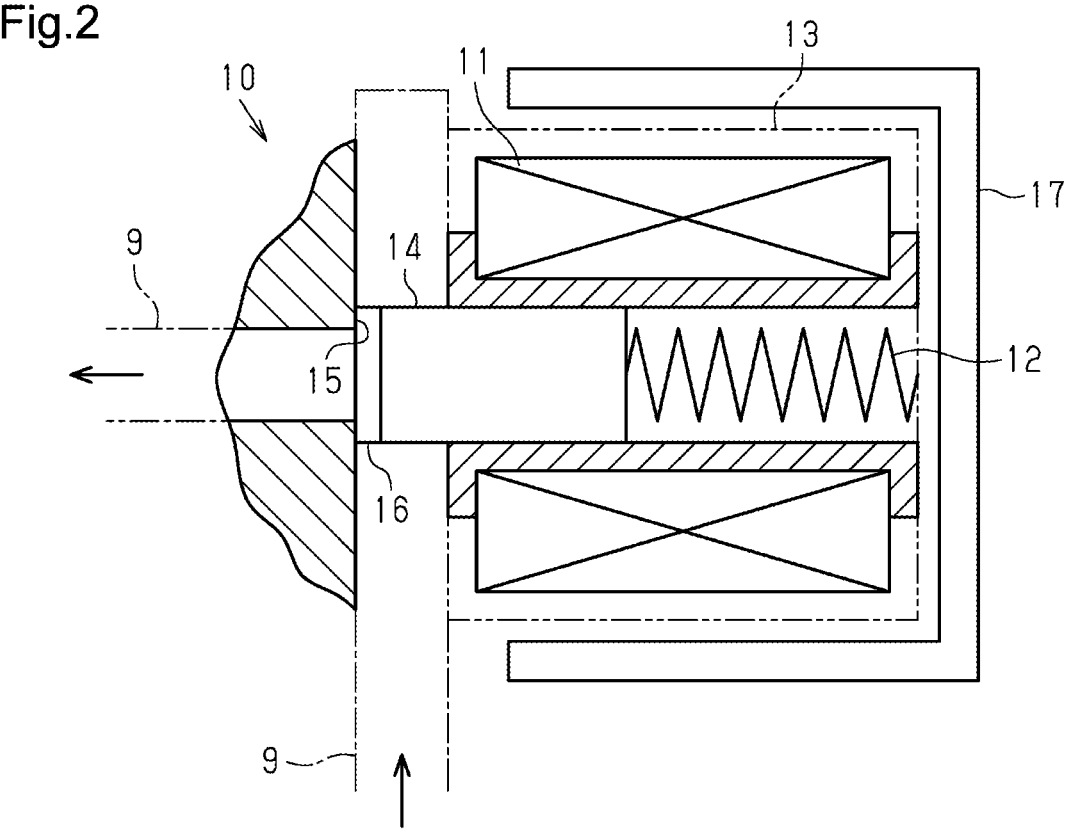
FIG. 2 is a schematic diagram showing the purge control valve of FIG. 1.

As shown in FIG. 2, the purge control valve 10 is a normally-closed electromagnetic valve including an electromagnetic solenoid 11 and a spring 12. The electromagnetic solenoid 11 and the spring 12 are arranged in a housing 13 of the purge control valve 10. The housing 13 also incorporates a moving core 14. The moving core 14 is allowed to move toward and away from a valve seat 15 of the purge control valve 10. A valve member 16 is provided at an end of the moving core 14 that is closer to the valve seat 15.

The moving core 14 is urged toward the valve seat 15 by the elastic force of the spring 12. The moving core 14 also receives an electromagnetic force generated by exciting the electromagnetic solenoid 11. When the electromagnetic solenoid 11 is de-excited, the elastic force of the spring 12 moves the moving core 14 toward the valve seat 15, so that the valve member 16 is pressed against the valve seat 15. This closes the purge control valve 10. Specifically, the valve member 16 disconnects the upstream section and the downstream section of the purge pipe 9 from each other.

When the electromagnetic solenoid 11 is excited to apply the electromagnetic force to the moving core 14, the moving core 14 is moved away from the valve seat 15 against the elastic force of the spring 12. When the moving core 14 is moved away from the valve seat 15, the valve member 16 separates from the valve seat 15. This opens the purge control valve 10. Specifically, the upstream section and the downstream section of the purge pipe 9 are connected to each other. The magnitude of the electromagnetic force acting on the moving core 14 is adjusted by controlling energization of the electromagnetic solenoid 11, that is, by controlling the current supplied to the electromagnetic solenoid 11. The position of the valve member 16 in relation to the valve seat 15 in the moving direction can be changed by adjusting the magnitude of the electromagnetic force. This in turn changes the opening degree of the purge control valve 10.

A heater 17 is attached to the purge control valve 10. The heater 17 generates heat when energized. The heater 17 may be attached to either the outer side or the inner side of the housing 13. The heater 17 functions as a heating unit that applies heat to the purge control valve 10 from outside the purge control valve 10. The heater 17 may include a positive temperature coefficient (PTC) type element, a nichrome wire, or a Peltier element. Alternatively, the heater 17 may be a heater that does not utilize magnetism, such as a ceramic heater.

Next, the control system of the internal combustion engine 1 and the fuel vapor treating apparatus 2 will be described.

As shown in FIG. 1, the vehicle is equipped with a controller 21. The controller 21 controls the internal combustion engine 1 and the fuel vapor treating apparatus 2. The controller 21 may be processing circuitry including: 1) one or more processors that operate according to a computer program (software); 2) one or more dedicated hardware circuits (application specific integrated circuits: ASIC) that execute at least part of various processes, or 3) a combination thereof. The processor includes a central processing unit (CPU) and memories such as a random-access memory (RAM) and a read-only memory (ROM). The memories store program codes or commands configured to cause the CPU to execute processes. The memory, which is a computer-readable medium, includes any type of media that are accessible by general-purpose computers and dedicated computers. Various types of sensors are connected to the controller 21. These sensors include a coolant temperature sensor 22, an air flow meter 23, and an air-fuel ratio sensor 24. The coolant temperature sensor 22 detects the temperature of coolant of the internal combustion engine 1. The air flow meter 23 detects the intake air flow rate of the internal combustion engine 1. The air-fuel ratio sensor 24 is arranged in the exhaust passage. Through detection of the oxygen concentration of exhaust gas, the air-fuel ratio sensor 24 detects the air-fuel ratio of the air-fuel mixture that has been burned in the combustion chamber of the internal combustion engine 1.

The controller 21 receives a signal from the coolant temperature sensor 22. This signal corresponds to the coolant temperature of the internal combustion engine 1. The controller 21 receives a signal from the air flow meter 23. This signal corresponds to the intake air flow rate of the internal combustion engine 1. The controller 21 receives a signal from the air-fuel ratio sensor 24. This signal corresponds to the air-fuel ratio of the air-fuel mixture that has been burned in the combustion chamber of the internal combustion engine 1. The controller 21 acquires the operating state of the internal combustion engine 1 based on signals from various types of sensors.

Various types of drive circuits are connected to the controller 21. These drive circuits include drive circuits for driving the throttle valve 5, the fuel injection valve 6, and the ignition plug 7. The controller 21 delivers command signals obtained based on the operating state of the internal combustion engine 1 to the drive circuits. This drives the throttle valve 5, the fuel injection valve 6, and the ignition plug 7. The controller 21 controls the internal combustion engine 1 by driving the throttle valve 5, the fuel injection valve 6, the ignition plug 7, and the like.

Also, the controller 21 controls energization of the electromagnetic solenoid 11 (FIG. 2). That is, the controller 21 controls current supplied to the electromagnetic solenoid 11. This drives the purge control valve 10. The controller 21 makes a purge request when predetermined conditions are satisfied. The controller 21 opens the purge control valve 10 based on the purge request. Thereafter, the controller 21 controls the opening degree of the purge control valve 10. Accordingly, purge gas is delivered to the intake passage 4 via the purge pipe 9. The purge request is made, for example, when the following conditions (A) to (C) are all satisfied.

(A) Completion of Warm-Up of the Internal Combustion Engine 1

Warm-up of the internal combustion engine 1 is determined to have been completed when the coolant temperature of the internal combustion engine 1 is greater than or equal to a predetermined value.

(B) Completion of Learning of an Air-Fuel Ratio Learning Value of the Internal Combustion Engine 1

The actual air-fuel ratio of the internal combustion engine 1, which is detected by the air-fuel ratio sensor 24, has a steady-state deviation from a target air-fuel ratio (for example, a stoichiometric air-fuel ratio). The air-fuel ratio learning value is learned as a value that corresponds to such a steady-state deviation. The air-fuel ratio learning value is used to correct a fuel injection amount in fuel injection amount control of the internal combustion engine 1. The correction in the fuel injection amount control includes a feedback correction for eliminating an instantaneous deviation of the air-fuel ratio from the target air-fuel ratio. The feedback correction corrects the fuel injection amount using the feedback correction value. The feedback correction value is increased or reduced so as to eliminate the instantaneous deviation. The air-fuel ratio learning value is updated to cause the feedback correction value to converge to a predetermined range. Since the feedback correction value is converged to the predetermined range, the air-fuel ratio learning value becomes a value corresponding to the steady-state deviation. The learning of the air-fuel ratio learning value is thus completed.

(C) Adsorbed Amount of Fuel Vapor in the Canister 8 Being Greater Than or Equal to a Predetermined Value.

The controller 21 learns a vapor concentration learning value, which corresponds to the vapor concentration in the purge gas, and records a history of the flow rate of the purge gas based on the operation of the purge control valve 10. The controller 21 estimates the adsorbed amount of fuel vapor in the canister 8 using at least one of the vapor concentration learning value and the history of the flow rate of purge gas. The controller 21 determines whether the adsorbed amount, which is estimated in the above-described manner, is greater than or equal to the predetermined value.

The controller 21 controls energization of the heater 17. Specifically, the controller 21 performs energization of the heater 17 by supplying current to the heater 17 after the internal combustion engine 1 is started and before a purge request is made. This causes the heater 17 to generate heat, so that the purge control valve 10 is heated from outside the purge control valve 10 by the heater 17. The controller 21 functions as a controlling unit that controls energization of the heater 17 to cause the heater 17 to generate heat. The controller 21 and the heater 17 form a heating device for heating the purge control valve 10. The fuel vapor treating apparatus 2 includes such a heating device.

Next, operations of the fuel vapor treating apparatus 2 and the controller 21 of the present embodiment will be described with reference to the flowchart of FIG. 3.

Figure 3:
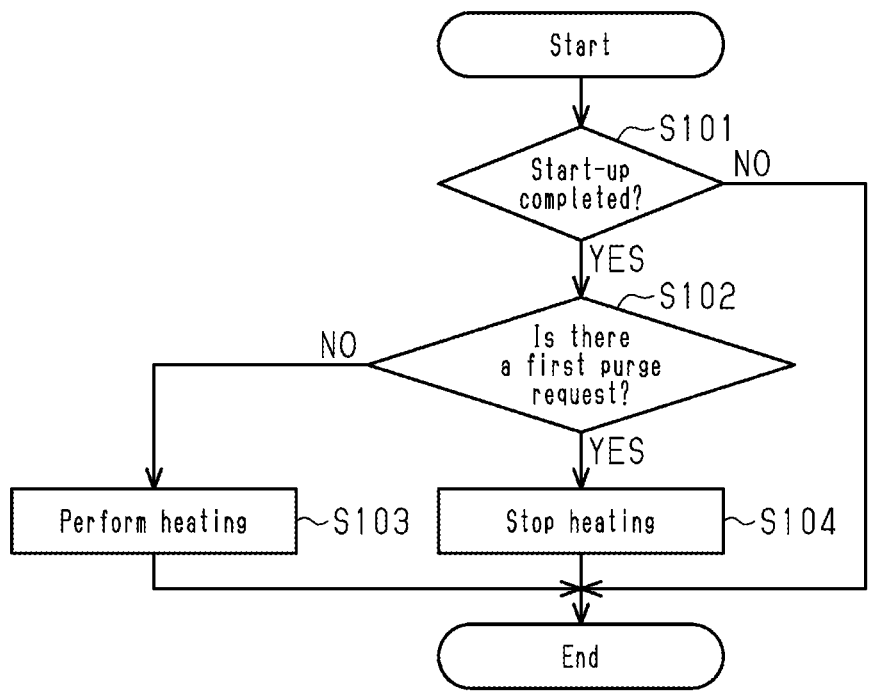
FIG. 3 is a flowchart showing a procedure for heating the purge control valve of FIG. 1.

FIG. 3 shows a procedure in which the heating device heats the purge control valve 10. The series of processes shown in FIG. 3 is periodically executed at predetermined time intervals. The controller 21 determines whether start-up of the internal combustion engine 1 has been completed as the process of step 101 (S101) of FIG. 3. When determining that the start-up of the internal combustion engine 1 has not been completed yet, the controller 21 temporarily suspends the series of processes shown in FIG. 3.

When determining that the start-up of the internal combustion engine 1 has been completed in S101, the controller 21 proceeds to S102. The controller 21 determines whether a first purge request has been made after completion of start-up of the internal combustion engine 1 as the process of S102. When determining that the first purge request has not been made after completion of start-up of the internal combustion engine 1, the controller 21 proceeds to S103. The controller 21 heats the purge control valve 10 as the process of S103. Specifically, the controller 21 performs energization of the heater 17, so as to cause the heater 17 to generate heat. This causes the heater 17 to heat the purge control valve 10 from outside the purge control valve 10. Thereafter, the controller 21 temporarily suspends the series of processes shown in FIG. 3.

When determining in S102 that the first purge request has been made after completion of start-up of the internal combustion engine 1, the controller 21 proceeds to S104. The controller 21 stops heating the purge control valve 10 as the process of S104. Specifically, the controller 21 stops energization of the heater 17, so as to stop causing the heater 17 to generate heat. Accordingly, the purge control valve 10 stops being heated by the heater 17 from outside the purge control valve 10. Thereafter, the controller 21 temporarily suspends the series of processes shown in FIG. 3.

The above-described embodiment has the following advantages.

(1) The purge pipe 9 of the fuel vapor treating apparatus 2 is made of a rubber hose or a nylon hose. Thus, the purge pipe 9 contains a mold release agent (such as stearic acid), which is used during manufacture of rubber hoses or nylon hoses. When purge gas flows through the purge pipe 9, which contain a mold release agent, the purge gas carries the mold release agent to the purge control valve 10. As a result, the mold release agent collects on the purge control valve 10. The viscosity of stearic acid used in the mold release agent increases at low temperatures. Thus, in a low-temperature condition such as after the internal combustion engine 1 is started, the collected mold release agent (stearic acid) may cause the purge control valve 10 to become stuck.

However, the purge control valve 10 is heated by the heater 17 after the internal combustion engine 1 is started and before a purge request is made. This increases the temperature of the mold release agent collected on the purge control valve 10 to a temperature higher than or equal to the melting point of the mold release agent. In this state, the viscosity of the mold release agent is reduced, so that the purge control valve 10 stops being stuck by the mold release agent. Therefore, when there is an attempt to open the purge control valve 10 based on the purge request, the present embodiment prevents the occurrence of a situation in which the purge control valve 10 becomes stuck and cannot be opened.

(2) The heater 17 is attached to the purge control valve 10 to heat the purge control valve 10 from outside the purge control valve 10. Thus, the heater 17 can be replaced with a heater that achieves desired heating performance in correspondence with the size and the like of the purge control valve 10. Therefore, regardless of the size and the like of the purge control valve 10, the present embodiment is capable of increasing the temperature of the mold release agent collected on the purge control valve 10 to a temperature higher than or equal to the melting point of the mold release agent after the internal combustion engine 1 is started and before a purge request is made.

(3) The amount of heat generation of the heater 17 can be changed through control of energization of the heater 17 by the controller 21. Therefore, if a heater having a sufficiently large maximum amount of heat generation is used as the heater 17, the amount of heat generation of the heater 17 can be adjusted through control of the energization of the heater 17, so as to heat the purge control valve 10 in correspondence with the size and the like of the purge control valve 10.

Second Embodiment

A fuel vapor treating apparatus according to a second embodiment will now be described with reference to FIG. 4.

Figure 4:
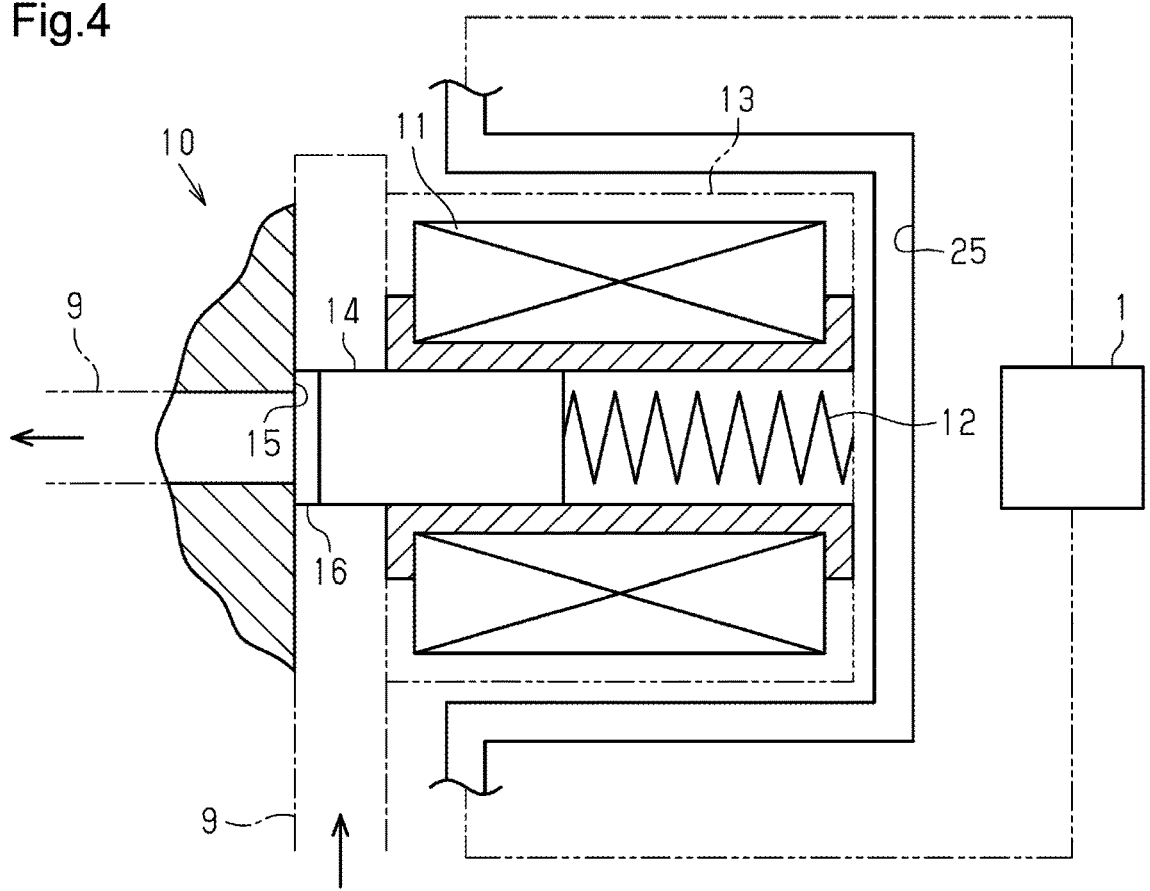
FIG. 4 is a schematic diagram showing a purge control valve according to a second embodiment.

As shown in FIG. 4, the present embodiment includes a coolant passage 25, through which the coolant of the internal combustion engine 1 flows. The coolant passage 25 serves as a heating unit that heats the purge control valve 10 from outside the purge control valve 10. The coolant passage 25 is arranged to pass through the internal combustion engine 1 and the purge control valve 10, such that the coolant circulates in the coolant passage 25.

The present embodiment has the following advantage.

(4) Coolant is heated through heat exchange with the internal combustion engine 1 after start-up, and heats the purge control valve 10 when passing through the coolant passage 25. Since the purge control valve 10 is heated using coolant of the internal combustion engine 1, the purge control valve 10 can be heated without providing a dedicated heater for heating the purge control valve 10.

Third Embodiment

A fuel vapor treating apparatus according to a third embodiment will now be described with reference to FIG. 5.

Figure 5:
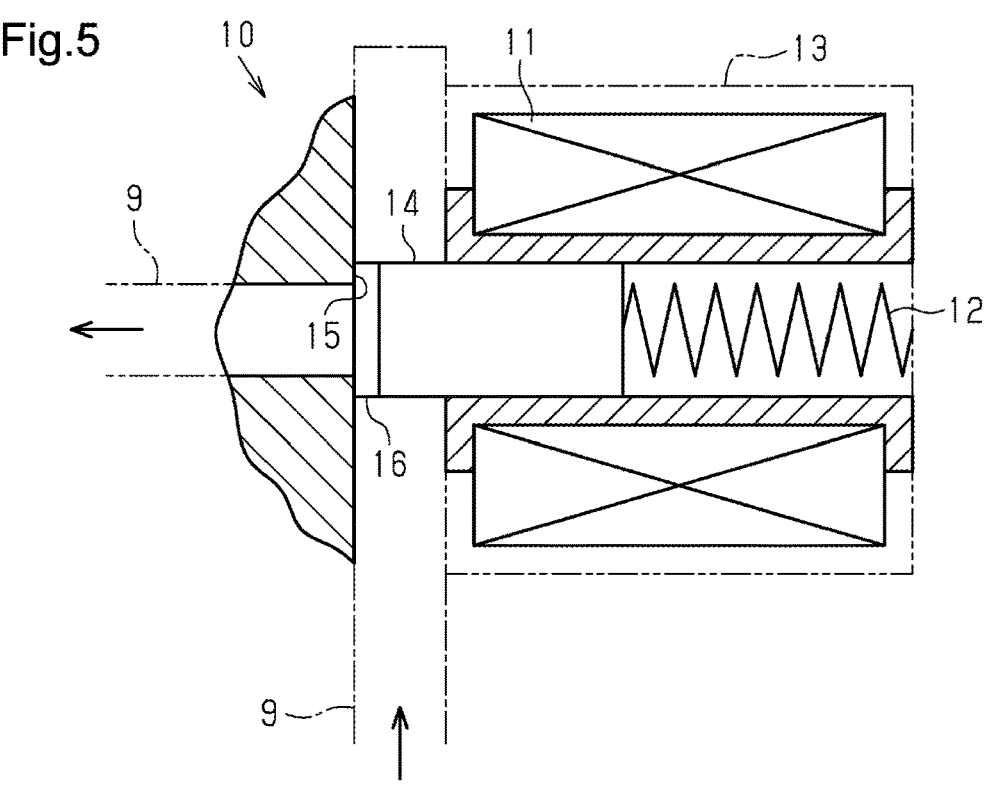
FIG. 5 is a schematic diagram showing a purge control valve according to a third embodiment.

As shown in FIG. 5, the present embodiment lacks a heating unit for heating the purge control valve 10, such as the heater 17 of the first embodiment or the coolant passage 25 of the second embodiment. The controller 21 of the present embodiment controls energization of the electromagnetic solenoid 11 so as to cause the electromagnetic solenoid 11 to generate heat while maintaining a closed state of the purge control valve 10 after the internal combustion engine 1 is started and before a purge request is made.

Specifically, the controller 21 energizes the electromagnetic solenoid 11 such that current flows in a first direction to the electromagnetic solenoid 11 when opening the purge control valve 10. Also, the controller 21 energizes the electromagnetic solenoid 11 such that current flows in a second direction, which is opposite to the first direction, to the electromagnetic solenoid 11 after the internal combustion engine 1 is started and before a purge request is made. The direction in which current flows in the electromagnetic solenoid 11 is also referred to as an energization direction to the electromagnetic solenoid 11. When the electromagnetic solenoid 11 is energized such that the energization direction is opposite to that when the purge control valve 10 is opened, the moving core 14, which has magnetism, is pressed against the valve seat 15. This causes the electromagnetic solenoid 11 to generate heat while the purge control valve 10 is maintained in a closed state.

After the internal combustion engine 1 is started and before a purge request is made, the controller 21 may energize the electromagnetic solenoid 11 with the same energization direction as that when opening the purge control valve 10 and at a frequency that does not open the purge control valve 10. Such a frequency may have a value that is greater than the frequency for opening the purge control valve 10 and does not allow the purge control valve 10 to respond to energization of the electromagnetic solenoid 11. Since the electromagnetic solenoid 11 is energized at a frequency that does not open the purge control valve 10, the electromagnetic solenoid 11 is heated while the purge control valve 10 is maintained in a closed state.

The present embodiment has the following advantages.

(5) After the internal combustion engine 1 is started and before a purge request is made, the controller 21 causes the electromagnetic solenoid 11 to generate heat through control of energization of the electromagnetic solenoid 11, without opening the purge control valve 10. The heat generated by the electromagnetic solenoid 11 heats the purge control valve 10. Since the purge control valve 10 is heated by using the electromagnetic solenoid 11, which is part of the purge control valve 10, there is no need to provide a dedicated heater for heating the purge control valve 10.

(6) If a configuration is employed in which the electromagnetic solenoid 11 is energized such that the energization direction to the electromagnetic solenoid 11 is opposite to that when opening the purge control valve 10, the electromagnetic force produced by that energization can be used to forcibly close the purge control valve 10.

Other Embodiments

The above-described embodiments may be modified to the forms described below, for example.

At least two of the first, second, and third embodiments may be combined.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:
1. A fuel vapor treating apparatus, comprising:
a canister configured to store fuel vapor generated in a fuel tank;
a purge pipe configured to deliver the fuel vapor stored in the canister to an intake passage of an internal combustion engine together with air;
a purge control valve configured to be attached to the purge pipe to be selectively opened and closed in order to adjust a purge flow rate, the purge control valve being configured to be opened based on a purge request that is made after the internal combustion engine is started; and a heating device configured to heat the purge control valve, wherein the purge control valve includes an electromagnetic valve that includes an electromagnetic solenoid and a spring, the heating device includes a controlling unit configured to control energization of the electromagnetic solenoid, and the controlling unit is configured to control energization of the electromagnetic solenoid so as to cause the electromagnetic solenoid to generate heat while maintaining a closed state of the purge control valve after the internal combustion engine is started and before the purge request is made.

2. The fuel vapor treating apparatus according to claim 1, wherein the purge control valve includes a normally-closed electromagnetic valve, the controlling unit is configured to energize the electromagnetic solenoid such that current flows in a first direction to the electromagnetic solenoid in order to open the purge control valve, and the controlling unit is configured to energize the electromagnetic solenoid such that current flows in a second direction, which is opposite to the first direction, to the electromagnetic solenoid after the internal combustion engine is started and before the purge request is made.

3. The fuel vapor treating apparatus according to claim 1, wherein the purge control valve includes a normally-closed electromagnetic valve, and the controlling unit is configured to energize the electromagnetic solenoid at a frequency that does not open the purge control valve after the internal combustion engine is started and before the purge request is made.

* * * * *